United States Patent Office 3,445,341
Patented May 20, 1969

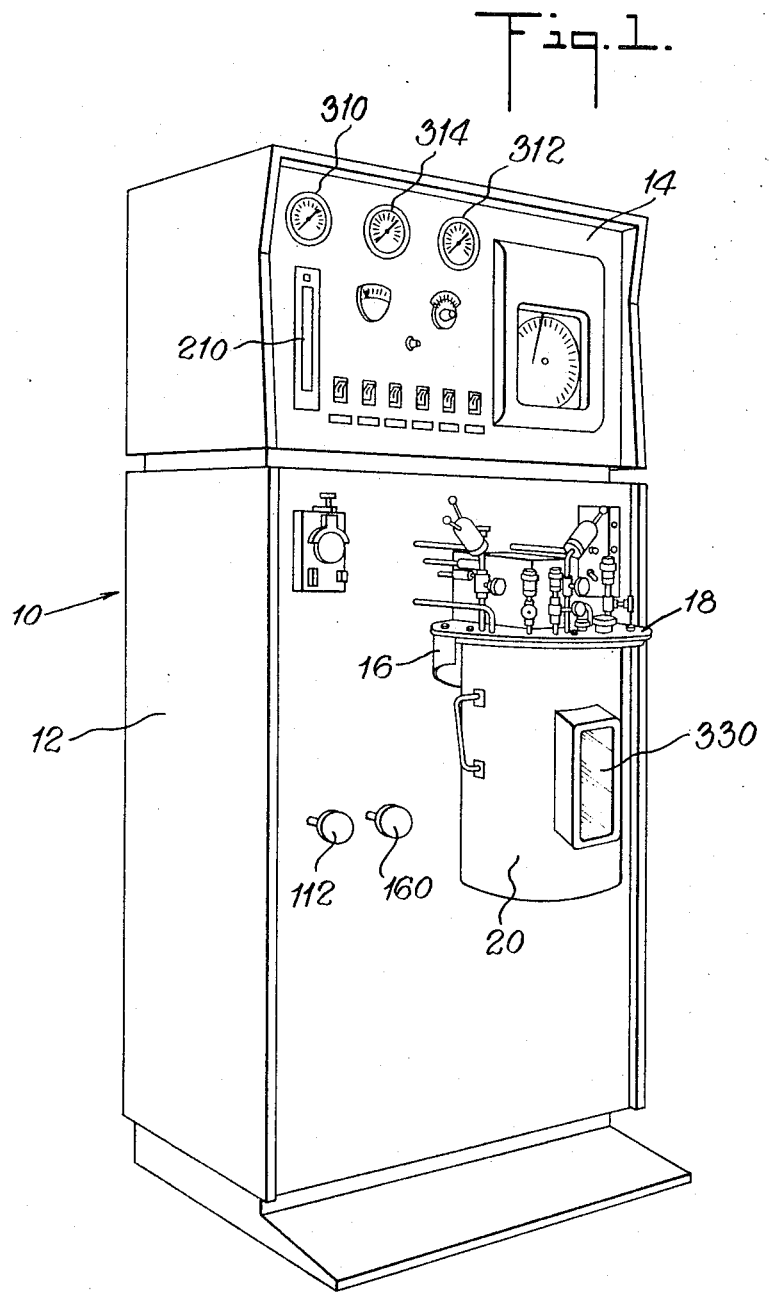

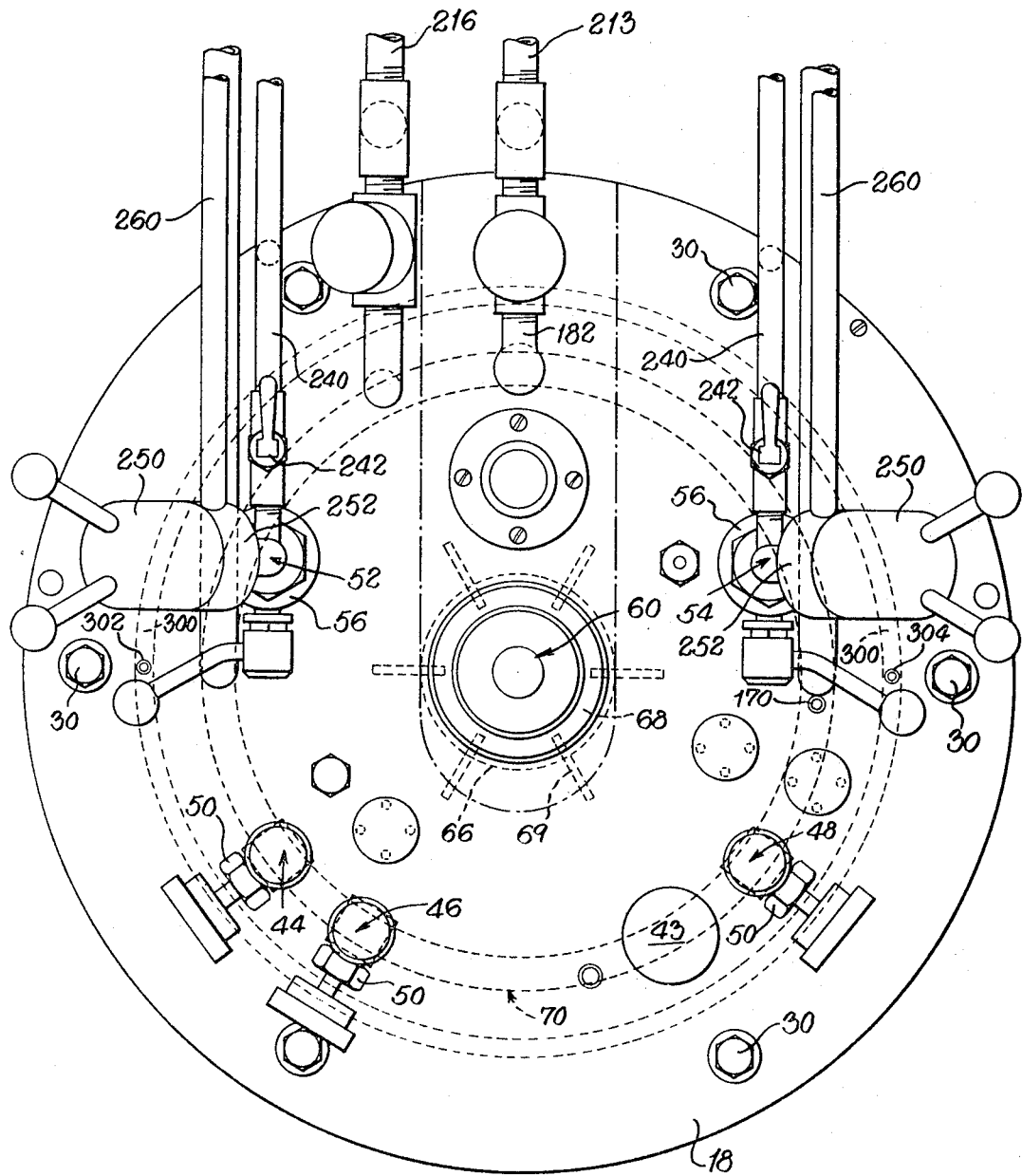

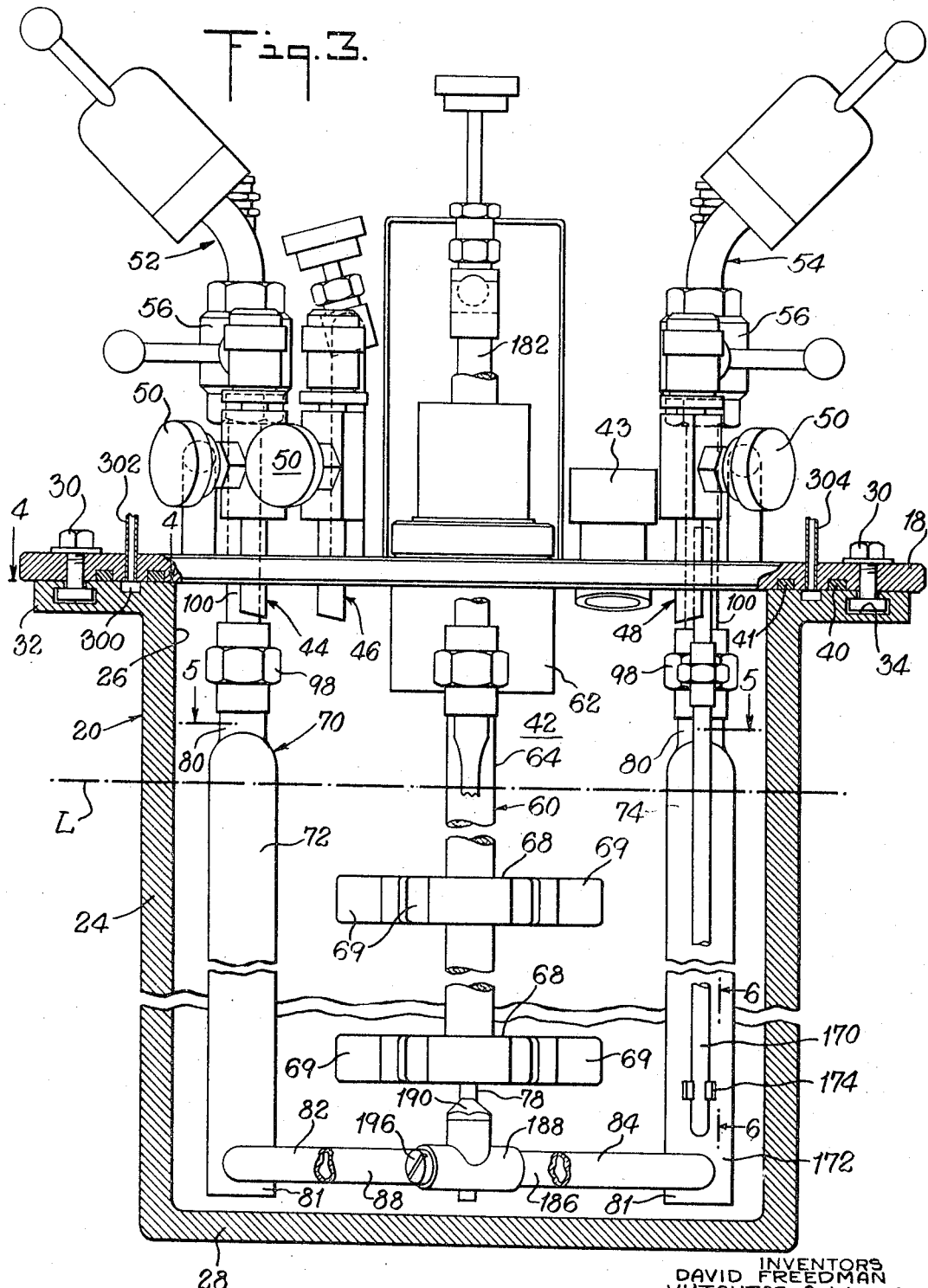

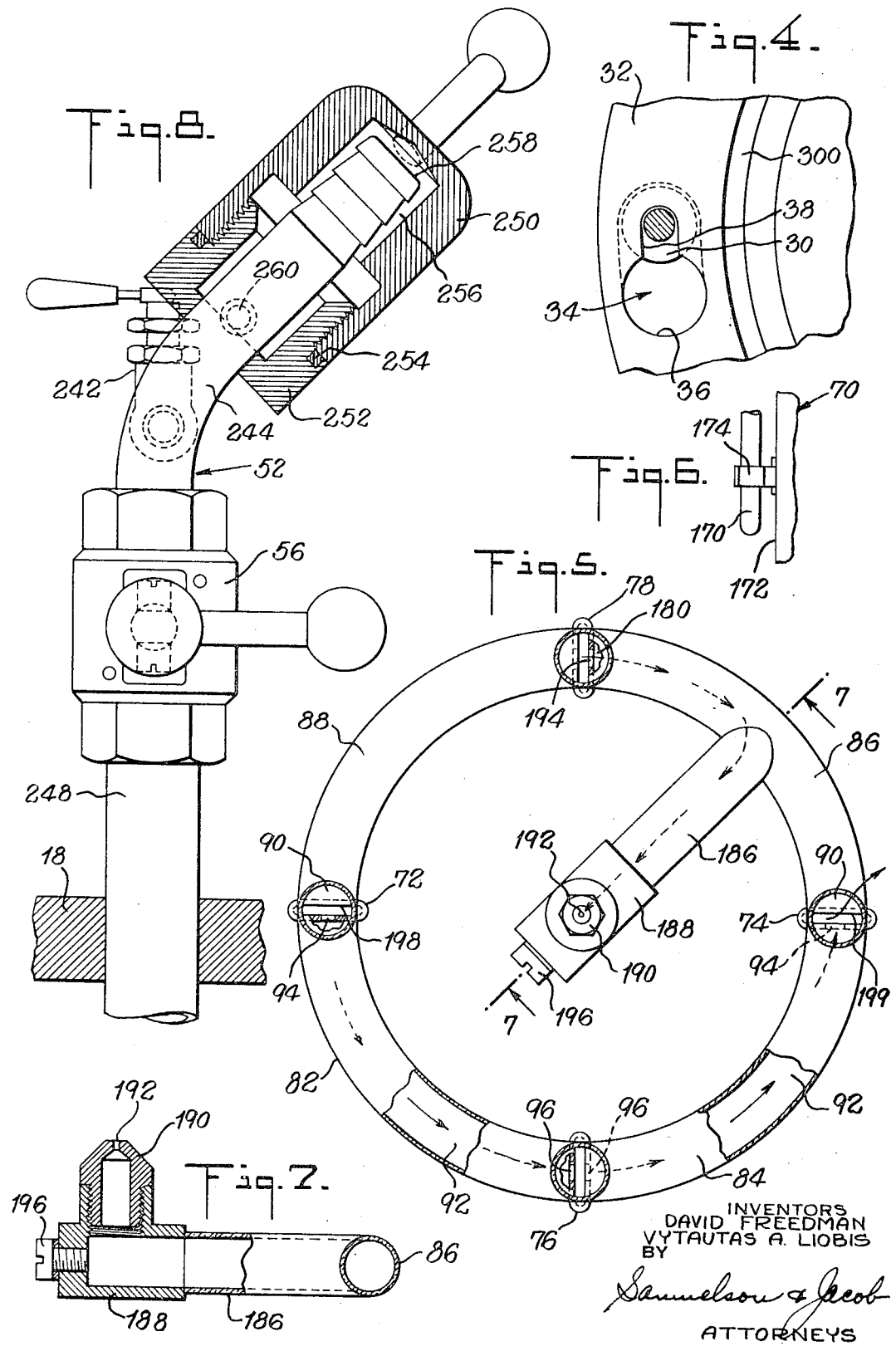

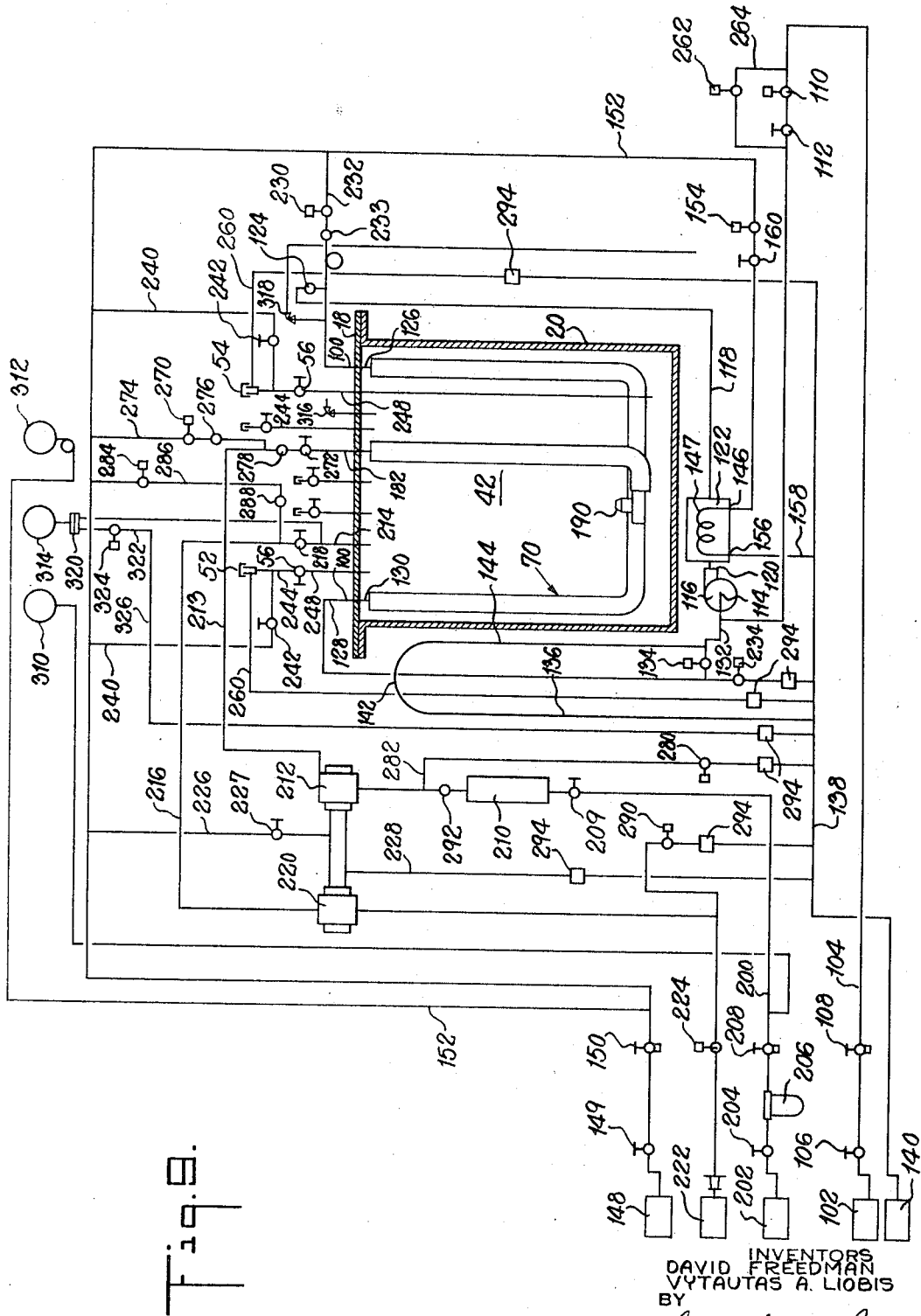

3,445,341
FERMENTATION APPARATUS WITH
STERILIZATION CAPABILITIES
David Freedman, Highland Park, and Vytautas A. Liobis, Plainfield, N.J., assignors to New Brunswick Scientific Co., Inc., a corporation of New Jersey
Filed June 17, 1966, Ser. No. 558,506
Int. Cl. C12b 1/22
U.S. Cl. 195—139
11 Claims

ABSTRACT OF THE DISCLOSURE

A vessel for containing a culture growth medium which has an open mouth and a head plate with an impeller in the vessel for agitating the growth medium and a baffle assembly in the vessel for providing turbulence and shearing action in the agitated growth medium and for establishing a path through the medium for circulating a heat exchange medium to control the temperature of the growth medium in response to the temperature sensing device located within the vessel and for circulating a relatively high temperature heat exchange medium for sterilization of the growth medium within the vessel. An additional feature relates to means for providing a steam barrier between the vessel and the head plate to prevent the escape of harmful pathogenic organisms.

---

The present invention relates generally to fermentation apparatus and pertains more specifically to improvements in relatively small fermentation apparatus which render the apparatus capable of sterilizing a culture growth medium contained therein and carrying out a subsequent fermentation process while in a fully assembled configuration.

In conducting microbial investigations both in laboratory and pilot-plant studies it has become increasingly important that such studies be accomplished under a wide range of fermentation conditions in an apparatus where such conditions can be closely controlled. Simplified, relatively small fermentation apparatus is now available for attaining carefully controlled conditions of temperature, pressure, agitation, and gas flow with minimum complexity in the cultivation of a broad range of organisms including aerobic and anaerobic bacteria, streptomycetes, molds and yeasts, as well as mammalian and plant tissue cultures and others.

It is an object of the present invention to provide an improvement in such relatively small fermentation apparatus which will allow the apparatus to sterilize a culture growth medium contained therein as well as subsequently perform a fermentation process while in a fully assembled configuration, thereby rendering the apparatus much more flexible and simple to use.

Another object of the invention is to provide improved fermentation apparatus wherein the means for sterilizing the culture growth medium contained therein is effectively combined with the means for controlling the amount of agitation, turbulence, shearing action and temperature in the form of a simplified unitary assembly.

A further object of the invention is to provide a unitary baffle assembly for effecting turbulence and shearing action in the agitated culture growth medium within the fermentation apparatus, the baffle assembly also serving as a heat exchanger which may be selectively employed for either heating or cooling a culture growth medium in the apparatus or for heating the medium in the apparatus to a sterilizing temperature to accomplish sterilization of the medium while the apparatus is in fully assembled configuration.

Another object of the invention is to provide a fermentation apparatus which may be employed with safety in fermentation processes including pathogenic organisms.

Still another objetc of the invention is to provide an improvement in relatively small fermentation apparatus which will allow the apparatus itself to be sterilizable in a fully assembled configuration, thereby rendering the apparatus much more simple to use and maintain.

A still further object of the invention is to provide improved fermentation apparatus as above wherein the means for sterilizing the apparatus itself is effectively combined with the means for controlling the amount of agitation, turbulence, shearing action and temperature in the form of a simplified unitary assembly.

Another object of the invention is to provide a unitary baffle assembly for effecting turbulence and shearing action in the agitated culture growth medium within the fermentation apparatus, the baffle assembly also serving as a heat exchanger which may be selectively employed for either heating or cooling a culture growth medium in the apparatus or for heating a sterilizing temperature to accomplish sterilization of the apparatus in fully assembled configuration thereby eliminating the need for dismantling the apparatus for sterilization.

The above objects, as well as further objects and advantages, are attained in the present invention which may be described briefly as a fermentation apparatus which is capable of sterilizing a culture growth medium contained therein prior to the inoculation of the culture growth medium with a culture and carrying out a subsequent fermentation process while in a fully assembled configuration, the apparatus including a frame, a head plate fixed to the frame, a vessel for containing the culture growth medium with the medium filling the vessel to a predetermined level, the vessel having a mouth and being removably mounted to the head plate at the mouth, impeller means extending into the vessel and mounted in the head plate for rotation within the vessel below the predetermined level of the medium therein, a baffle assembly fixed to the head plate and extending into the vessel below the predetermined level of the medium therein, the baffle assembly including at least two hollow tubular baffle members, each having an unobstructed passage therein and means interconnecting the passages to one another to established a path passing through the baffle members and through the medium in the vessel, first means interconnected with the baffle assembly through the head plate for circulating a heat exchange medium through the path passing through the baffle members during a fermentation process, the first means being responsive to the temperature of the culture growth medium to selectively circulate a heat exchange medium which is relatively warmer or cooler than the culture growth medium for regulating the temperature thereof, second means interconnected with the baffle assembly through the head plate for circulating a relatively high temperature heat exchange medium through the path passing through the baffle members when the culture growth medium in the vessel is to be sterilized for raising the temperature of the culture growth medium to a sterilizing temperature, and third means for selectively interconnecting either the first means or the second means with the path passing through the baffle members such that the first means may be interconnected during the fermentation process and the second means may be interconnected when the culture growth medium in the vessel is to be sterilized.

The invention further contemplates a sealing structure including sealing means between the mating surfaces of the head plate and the vessel for establishing a sealed chamber within the vessel and means juxtaposed with the sealing means for receiving steam to establish a steam barrier between the sealed chamber and the outside of the vessel adjacent the mouth of the vessel.

The invention will be more fully understood and further objects and advantages of the invention will become apparent in the following detailed description of an embodiment of the invention illustrated in the accompanying drawings, in which:

FIGURE 1 is a perspective view of a fermentation apparatus constructed in accordance with the invention;

FIGURE 2 is a plan view of the head plate covering the fermentation vessel employed in the apparatus of FIGURE 1;

FIGURE 3 is an elevational view, partially sectioned, of the head plate and the fermentation vessel suspended therefrom;

FIGURE 4 is a cross-sectional view taken along line 4—4 of FIGURE 3;

FIGURE 5 is a cross-sectional view taken along line 5—5 of FIGURE 3;

FIGURE 6 is a detail of the baffle assembly viewed from line 6—6 of FIGURE 3;

FIGURE 7 is a cross-sectional view taken along line 7—7 of FIGURE 5;

FIGURE 8 is an enlarged detail, partially sectioned, of a sterilizable port of the apparatus of FIGURE 1; and FIGURE 9 is a schematic piping diagram of the apparatus of FIGURE 1.

Referring to the drawing, and especially to FIGURE 1, a fermentation apparatus is pictured at 10 and includes a housing 12 with a control panel 14. A forked bracket 16 is fixed to a frame within the housing and extends outwardly from the housing and supports a head plate 18 from which is suspended a growth vessel 20.

Turning now to FIGURES 2 and 3, growth vessel 20 of fermentation apparatus 10 is generally cylindrical and is seen to have a cylindrical wall 24 extending from an open mouth 26 at the top to a closed bottom 28. Mouth 26 is closed during use by means of the head plate 18, which acts as a cover, the growth vessel 20 being suspended from the head plate by means of nut and bolt assemblies 30 extending through the head plate adjacent the perimeter thereof and into an annular flange 32 which is integral with the growth vessel and contains keyhole slots 34 (see FIGURE 4) for receiving the nut and bolt assemblies 30. The keyhole slots 34 facilitate the assembly or disassembly of the growth vessel 20 with the head plate 18 and allow such assembly or disassembly to be performed by a single operator. Thus, in assembling the growth vessel with the head plate, the enlarged opening 36 of each keyhole slot 34 is placed over a corresponding nut and bolt assembly 30 and the growth vessel is rotated through a small angle to bring each nut and bolt assembly within the narrow leg 38 of each keyhole slot so that the vessel will be suspended from the head plate even though the nut and bolt assemblies are not tightened. Subsequent tightening of the nut and bolt assemblies may be accomplished without the necessity for providing any further means for supporting the vessel juxtaposed with the head plate. Upon tightening the nut and bolt assemblies, resilient gaskets 40 and 41 will seal the head plate against the vessel to establish a completely closed and sealed chamber 42 within the growth vessel.

In using the fermentation apparatus 10 of which vessel 20 is a part, a culture growth medium is placed within the vessel, generally through a filling port 43, and fills the vessel up to a predetermined level indicated approximately by dashed line L. A plurality of ports are provided in the head plate in addition to filling port 43 and communicate with the sealed chamber 42 within the vessel for accommodating a variety of functions and devices. For example, ports 44 and 46 may be employed for the addition of pH buffer solutions and port 48 may be employed for the addition of anti-foam agents, each of the ports having valves 50 for sealing the ports so as to maintain the chamber closed and sealed when the ports are not in use. In addition, the apparatus is provided with an inoculation port 52 and a sampling port 54, both of which are provided with a valve 56 for closing the port when that port is not in use. The structure of these ports will be explained in greater detail hereinafter.

In order to agitate the culture growth medium in a radial pattern and achieve aeration and uniform dispersion of constituents in the culture growth medium, an impeller assembly 60 is mounted for rotation in the vessel by means of a bearing housing assembly 62 which is fixed in the head plate 18 and which carries the drive shaft 64 of the impeller assembly through the head plate for rotation by a drive belt (not shown) which is driven by motor means (not shown) mounted within the housing 12. Impellers are shown in the form of two turbine-type impellers 68 which are mounted upon the drive shaft 64 and have flat stirring paddles 69. The impellers 68 are fixed to the drive shaft 64 during operation, but may be removed therefrom and may be replaced by any of a variety of impellers having configurations designed for specific fermentation operations. The positions of the impellers along the drive shaft are adjustable so as to allow for the processing of smaller or larger working volumes in the vessel as desired. Additional impellers may be employed for more intense agitation and greater aeration.

The necessary turbulence and shearing action is established in the agitated culture growth medium by means of a baffle assembly 70 which is also fixed to the head plate 18, as will be described below, and provides baffle members 72, 74, 76 and 78 extending vertically from the top of the vessel toward the bottom. The concentric arrangement of the impeller and baffle assemblies 60 and 70, respectively, in the vessel 20 provides the requisite agitation, turbulence and shearing action in the culture growth medium.

Ordinarily, the temperature of the culture growth medium in the vessel of a fermentation apparatus is maintained at the required level by jacketing of the vessel to allow water or another heat exchange medium to be circulated about the vessel for heating or cooling purposes or by immersing the vessel in a water bath. Jacketed vessels are more complex and more expensive than a single-walled vessel, however, and are hence less desirable in providing a less expensive fermentation apparatus of relatively small proportions. Both jacketed systems and water bath systems suffer from a time lag between a change in the temperature of the heat exchange medium and a corresponding change in the temperature of the culture growth medium due to the time required for the vessel wall to transfer heat between the heat exchange medium and the culture growth medium in such systems. The inability of these systems to respond quickly to temperature changes may be characterized as "thermal lag" and renders such systems difficult to control with a high degree of accuracy with respect to the temperature of the culture growth medium. Jacketing and water baths can be eliminated by the provision of internal conduits which could carry a heat exchange medium through the growth medium; however, it is desirable to maintain the number of conduits within the vessel at a minimum, especially in vessels having a relatively small capacity, for example, five to twenty-four liters, so that the reduction in the usable volume of the vessel by the insertion of conduits will not reduce the capacity to an uneconomically small amount in comparison to the overall size of the vessel. Furthermore the presence of additional conduits within the vessel can detract from the turbulence in the growth medium by slowing the motion of the liquid and thus can disturb the prescribed cooperation between the impellers and the baffles and disrupt the operation of the apparatus. The baffle assembly 70 eliminates the necessity for external jacketing or additional internal conduits to attain a controlled temperature in the culture growth medium as will now be explained in connection with FIGURES 3 and 5.

Baffle assembly 70 is a unitary structure having baffle members 72, 74, 76 and 78 each extending vertically from a head 80 to a base 81. The baffle members are interconnected adjacent the bases thereof by means of horizontal elements 82, 84, 86 and 88. Each of the pair of diametrically opposed baffle members 72 and 74 is a hollow tubuar member provided with an unobstructed passage 90 extending from head to base thereof. Each of the horizontal elements 82 and 84 is also hollow and tubular and is provided with an unobstructed passage 92. Passages 92 are interconnected with each of the passages 90 at openings 94 adjacent the bases 81 of baffle members 72 and 74 and are interconnected with one another through openings 96 adjacent the base of baffle member 76 so that an open path is established from the head of baffle member 72 to the head of baffle member 74 through each of these baffle members and through horizontal elements 82 and 84. Each head 80 of baffle members 72 and 78 is provided with a coupling 98 which interconnects these baffle members with conduits 100 fixed in the head plate 18 and extending into the housing 12 of the apparatus 10. The conduits 100 form a part of a circulatory system which is capable of circulating a heat exchange medium through the conduits 100 and thus through the growth medium in the vessel along the path defined by the passages in baffle members 72 and 74 and horizontal elements 82 and 84 in a manner which will be described hereinafter.

Ferementation apparatus 10 includes a water circulating system of which the conduits 100 are a part so that either relatively warm or cool water may be circulated through the culture growth medium along the path provided by baffle assembly 70 for heating or cooling the culture growth medium to maintain a desired temperature level. As illustrated schematically in FIGURE 9, water is introduced into the water circulating system from an outside source of relatively cool water, such as tap 102, through an inlet line 104 and manually operated main service valve 106. A pressure reducing valve 108 serves to reduce the flow of tap water to an acceptable level and thus reduce surge in line 104. Line 104 leads inlet water through a solenoid operated inlet control valve 110 and a manually adjustable needle valve 112 to the inlet 114 of a circulating pump 116. A line 118 connected to the outlet 120 of the pump 116 carries the tap water fror the pump to a heat exchanger 122 and through a check valve 124 to the inlet 126 of the baffle assembly 70. A return line 128 is connected to the outlet 130 of the baffle assembly 70 and leads to recirculating line 132 which carries circulating water through solenoid operated recirculating valve 134 back to the inlet 114 of the pump 116. The water entering the system at the tap 102 is relatively cool compared to the usual temperature of the culture growth medium in the vessel 20. The water circulated by the circulating pump 116 through the baffle assembly 70 may be maintained relatively warmer or cooler than the temperature of the culture growth medium. To provide relatively warmer water, the solenoid operated inlet control valve 110 is closed and solenoid operated recirculating valve 134 is maintained open so that the circulating pump will recirculate water through the heat exchanger 122 until the water is brought up to the desired relatively warm temperature. When relatively cool water is desired, the heat exchanger 122 may be deactivated (as will be explained below) and inlet control valve 110 is opened to feed cool water, metered by needle valve 112, to the inlet of the pump and through the system. Excess water in the circulatory system will be dumped through line 136 which is connected to main drain line 138 which leads to a drain 140. Line 136 is looped such that the top of the loop 142 is raised vertically above the conduits 100 so that leg 144 of looped line 136 will serve as a standpipe to feed small amounts of water to the circulatory system to assure that the system is full of water even though inlet control valve 110 may be closed.

The inlet 146 of the heat exchanger coil 147 is connected to a source of steam 148 through a main service valve 149 and a pressure reducing valve 150 by line 152 which passes through a solenoid operated inlet control valve 154 on its way to the inlet 146 of the heat exchanger coil. The outlet 156 of the heat exchanger coil is connected through line 158 to the main drain line 138. A manually operated needle valve 160 is mounted on the panel of the apparatus. When heat is called for in the circulating water, the solenoid operated inlet control valve 154 is opened to permit steam, metered by needle valve 160, to circulate through the heat exchanger coil 147 and transfer heat to the circulating water in line 118 and through the baffle assembly 70. When no heat is required in the heat exchanger, the solenoid operated inlet control valve 154 will close line 152 and no further heat will be transferred to the circulating water.

As best seen in FIGURES 3 and 6, the baffle assembly 70 is provided with a temperature sensing means shown in the form of a tubular element 170 fixed to one of the planar side faces 172 of a baffle member through which water is circulated. Tubular element 170 contains a temperature sensing device, such as a thermistor, and is spaced from planar side face 172, as well as fixed thereto so that the temperature detected by the sensing device will be that of the tubular element 170, which temperature is related to the temperature of the culture growth medium and the temperature of the baffle member, heat being conducted between the baffle member and the tubular element through the support clip 174 which fixes and spaces the tubular element 170 with respect to the baffle member. It will be apparent that the location of the temperature sensing device essentially within the culture growth medium in conjunction with the employment of the baffle assembly which provides a path through the culture growth medium for the heat exchange medium attains a quick response to temperature changes in the culture growth medium and a reduction in thermal lag to achieve a corresponding quick heat transfer between the culture growth medium and the heat exchange medium to maintain close and accurate temperature control in the culture growth medium. Since the vessel wall 24 no longer affects such heat transfer, thermal lag is reduced to a minimum. Such quick response in temperature control is particularly important in fermentation operations where excessive heating or cooling, even for short periods of time and in localized areas, can cause harmful effects such as the killing of bacteria. Because of the relationship between the temperature sensing means and the baffle assembly, the walls of the baffle members are kept at a relatively even temperature to prevent excessive increases or decreases in temperature at the baffle surfaces and preclude a concomitant adverse effect of such temperatures.

During the operation of apparatus 10, the circulating pump 116 operates to continuously circulate water through the baffle assembly in the direction of the arrows in FIGURE 3. Should the temperature of the growth medium drop below a predetermined desired level, the drop will be detected by the temperature sensing device in tubular element 170 and, through an electrical circuit passing upwardly through tubular element 170 and out of the vessel into the supplementary apparatus, the device will actuate solenoid operated inlet control valve 154 to open the valve and admit steam to the heat exchanger 122, thereby raising the temperature of the recirculating water. Should the temperature of the culture growth medium rise above the predetermined temperature level, the temperature sensing device will actuate the cooling water inlet control valve 110 to permit relatively cool water to be circulated through the baffle assembly. At the same time the steam inlet valve 154 may be actuated to stop the flow of steam to the heat exchanger 122, thereby reducing the temperature of the circulating water.

In frementation processes it is often necessary to introduce air or other gases into the culture growth medium adjacent the bottom of the growth vessel so that the gas will rise and bubble through the growth medium. Thus, fermentation vessels generally include at least one sparger line leading to a sparger located beneah the lowest impeller. As explained above, it is desirable in relatively small fermentation vessels to reduce the number of conduits, or "penetrations," within the vessel to a minimum. Referring now to FIGURES 3, 5 and 7, baffle assembly 70 serves to further reduce the number of conduits by providing an unobstructed passage 180 extending from head to base of baffle member 78, which is also a hollow tubular member, and is couplde to a conduit 182 (see FIGURE 2) by means of coupling (not shown). The conduit 182 extends through the head plate 18 and into the housing 12 where it is connected to an air line leading to a source of air or another gas, as will be explained below. As best seen in FIGURES 3, 5 and 7, a leg 186 extends radially from a horizontal element 86 and includes means illustrated in the form of a fitting 188 with a nozzle 190 therein lying below the lowermost impeller and providing an orifice 192 aligned with the central axis of the vessel. Leg 186, fitting 188 and horizontal element 86 have interconnected unobstructed internal passages which are, in turn, interconnected with passage 180 through an opening 194 adjacent the base of baffle member 78. Thus, an open path is established between head 80 of baffle member 78 and orifice 192 so that gas supplied from a source to the head of baffle member 78 will be introduced into the culture growth medium at a desired location (as indicated by the arrows in FIGURE 3) without the necessity for an additional conduit or separate sparger line. A threaded plug 196 may be removed to enable cleaning of the internal portions of the fittings 188 and the leg 186 so as to maintain an unobstructed path for the gas. It will be apparent that the single orifice nozzle 190 may be replaced with means providing a plurality of orifices such as a ring sparger containing a series of perforations along the circumference thereof, or a sintered disk sparger having a porous structure providing a multiplicity of orifices in the form of pores, the construction of fitting 188 upon leg 186 allowing interchangeability among a variety of sparger structures in baffle assembly 70.

It is noted that the path of the heat exchange medium through baffle members 72 and 74 and horizontal elements 82 and 84 is isolated from the path of the gas through baffle member 78, horizontal member 86 and leg 186 by virtue of the partitions provided at 198 and 199 by the walls of baffle members 72 and 74, respectively.

The entire baffle assembly 70 is readily fabricated in a unitary structure by joining a series of hollow tubular components which form the baffle members and horizontal elements. For example, the components may be made from stainless steel tubing and welded together into an integral baffle assembly. The wall thickness of the baffle member is preferably maintained relatively thin so as to enhance the conductivity of heat between the heat exchange medium and the culture growth medium and reduce thermal lag to a minimum. A wall thickness of approximately 0.018 inch has been found satisfactory in apparatus of the size and capacity set forth above.

As set forth above, baffle assembly 70 is fixed to the head plate 18 by means of the head 80 of each of the baffle members 72, 74 and 78 being coupled to conduits fixed in the head plate and passing therethrough. Since baffle member 76 requires no conduit connection, it may merely be terminated at its upper end which is then seated in a complementary socket in the head plate.

As seen in the schematic diagram of FIGURE 9, the apparatus is provided with an integral air system in which air line 200 is connected to a supply oof air 202 under pressure through a main service inlet valve 204.

The air is then conducted through an initial filter 206 to a pressure regulating valve 208. Line 200 then continues through a flow regulating valve 209 and a flowmeter 210 and through a steam-jacketed inlet filter 212 to the air conduit 182 and thence through the head plate 18 into baffle assembly 70 and subsequently to the sparger in the form of nozzle 190 at the base of the baffle assembly. It will be apparent that since air is led into the sealed chamber 42 provided by the vessel 20, provisions must be made for the exhaust of air from the sealed chamber. Thus, an exhaust conduit 214 passes through the head plate and is connected to an exhaust line 216 through a valve 218, line 216 passing through an exhaust filter 220, which is also steam-jacketed, and thence to an air exhaust 222 through a solenoid operated valve 224. Steam is selectively fed to the jacket of the inlet filter 212 and the exhaust filter 220 through line 226 and valve 227 and the condensate is passed to the main drain line 138 through line 228.

Fermentation apparatus 10 provides facilities for sterilizing a culture growth medium ordinarily placed within the vessel 20 through filling port 43 and for sterilizing all process lines, including air supply and exhaust lines, so that processes carried out in the apparatus may be initiated by sterilization of the entire system. Referring to the schematic diagram of FIGURE 9, it will be seen that by closing solenoid operated valve 110 the inlet of all water to circulating pump 116 may be shut off and by opening a solenoid operated valve 230 in a line 232 interconnecting the inlet 126 of the baffle assembly with the main steam line 152 through a check valve 233, steam may be introduced into the baffle assembly in place of water. The steam is kept from pump 116 by closing valve 134 and may be exhausted through the outlet line 128 and through a solenoid operated valve 234 to the main drain line 138. By thus passing steam through the baffle assembly 70 the temperature of the medium in the vessel may be raised to a sterilizing temperature thereby accomplishing sterilization of the medium.

The inoculation port 52 and the sampling port 54 may also be sterilized by employing steam from the main steam line 152. With reference to FIGURES 2, 8 and 9, a steam line 240 leading from the main steam line 152 is passed through a manually operated steam valve 242 to an inlet tube 244 lying above the manually operated valve 56 closing the line leading from the respective port 52 or 54 to the conduit 248 passing through the head plate. With the cap 250 threaded in place upon the collar 252 fitted to the tube 244 and against the seal 254, a chamber 256 is established around the opening 258 of the tube which comprises the port. By closing the manually operated valve 56 leading to the conduit 248, and by opening the manually operated steam valve 242, steam is passed through the tube 244 and into the chamber 256 for sterilizing the entire tube and the port provided at the opening 258 thereto. The condensate is drained through a condensate line 260 connected to the collar 252 at the base of the chamber 256. Thus, the apparatus allows initial sterilization of the inoculation port 52 and the sampling port 54 as well as sterilization of the medium within the vessel prior to the initiation of the fermentation process. Following sterilization, the vessel may be cooled rapidly by the circulation of cold water through the baffle assembly. Such circulation is accomplished by opening solenoid operated by-pass valve 262 to allow cool water to by-pass the metering valve 112 via by-pass line 264 thereby effecting rapid flow of cool water and concomitant rapid cooling of the baffle assembly and the sterile medium. By-pass valve 262 and line 264 may also be employed to initially fill the circulatory system, the metering valve 112 being employed only during automatic temperature control operation. Operating temperature is then stabilized automatically by the temperature sensing means. The medium can then be inoculated with a selected organism through the now sterile inoculation port, and the required degree of agitation and air flow may be established by the impeller assembly and the sparger. Periodic sampling may be accomplished through the sampling port. Sealed chamber 42 is thus entirely isolated from beginning to end of a complete fermentation operation.

The integrated steam piping system may also be employed to clean the apparatus without disassembling the vessel from the head plate. Thus, the interior of the vessel may be steamed by selecting the proper valves to pass steam into the vessel as desired. For example, steam may be selectively conducted into the vessel through the sparger by opening solenoid operated valve 270 and valve 272 so that steam can flow through line 274 and check valves 276 and 278 and into conduit 182. Also, the inlet filter 212 may be sterilized by passing steam through line 213 which connects with line 274, the condensate being drained through valve 280 in line 282. Likewise, steam may be conducted into the vessel through the exhaust conduit 214 by opening solenoid operated valve 284 and valve 218 to allow steam to pass through line 286 and check valve 288, making sure that solenoid operated valves 290 and 224 are closed. Steam may also be introduced through the inoculation or sampling ports. The air lines 213 and 216 may also be selectively steam-sterilized by opening valves 270, 280, 284 and 290 and closing valves 218, 224 and 272, the check valve 292 assuring that steam does not pass into the flowmeter 210. For faster sterilization when cleaning, water may be passed into the vessel, usually through the filling port 43, and heated by passing steam through the baffle assembly, as described above, to sterilize all of the internal portions of the vessel and the components therein. In addition, the inoculation port and the sampling port may be sterilized at any time prior to, during, or after a fermentation process. Each of the other ports may be made steam-sterilizable by constructions similar to the inoculation and sampling ports. Each of the condensate lines which carry the exhausted steam to the main drain line is provided with a steam trap 294 which assures that relatively high pressure steam is not exhausted to the drain.

When apparatus 10 is employed in fermentation operations which include the use of pathogenic organisms, operation of the apparatus with safety requires that such organisms be confined to the sealed and isolated chamber 42. As best seen in FIGURES 2 and 3, the sealing means provided by first and second gaskets 40 and 41 is supplemented by a live steam barrier lying between the gaskets. The live steam barrier serves to destroy any pathogenic organism which might otherwise escape from the vessel by passing between the mating surfaces of the head plate 18 and the flange 32 of the vessel. The steam barrier is established by placing a trough 300 in flange 32, the trough being annular and lying between the annular gaskets 40 and 41. An inlet conduit 302 passes through the head plate to communicate with the trough and is connected to a source of steam to feed live steam into the trough. An outlet conduit 304 also communicates with the trough for carrying away the condensate. The steam is sealed within the trough by the annular gaskets 40 and 41. An analogous seal structure employing a live steam barrier may also be employed in the bearing housing assembly 62 to assure that pathogenic organisms cannot escape along the drive shaft 64.

As seen in FIGURE 9, a first pressure gauge 310 is provided to measure the pressure of the incoming air, a second pressure gauge 312 measures the steam pressure and a third pressure gauge 314 measures the pressure within the vessel itself. Each of these pressure gauges may be seen mounted in the control panel as illustrated in FIGURE 1.

A pressure relief valve 316 protects the integrity of the sealed chamber in the vessel, while a pressure relief valve 318 protects the circulatory system which includes the baffle assembly. A diaphragm assembly 320 isolates the vessel pressure gauge 314 from the sealed chamber 42 so that steam will not pass into the gauge. The diaphragm assembly is sterilized by steam entering through line 322, the condensate being exhausted through solenoid operated valve 324 and line 326.

Where it is desired to observe the culture growth medium during fermentation operations, a viewing window 330 may be placed in the vessel, as seen in FIGURE 1. Since the vessel is a single-walled construction, it is relatively easy to provide a large viewing window in the wall of the vessel without encountering difficulties which might be imposed by placing a window in a jacketed vessel. As shown, window 330 may be a relatively large, rectangular construction without loss of accurate control of the temperature of the culture growth medium.

It will be apparent that by providing an integrated steam piping system within the fermentation apparatus 10, without unduly increasing the complexity of the apparatus, the apparatus has been rendered more flexible in use and better control is achieved without sacrificing simplicity. The ability of the apparatus to operate in laboratory or pilot-plant fermentation operations is enhanced. The vessel, as well as all of the attendant component parts may be fabricated readily of a sterilizable material, such as stainless steel, which will provide long life and good service. Since the vessel is a single-walled construction, it is relatively light in weight and may be handled easily during assembly and disassembly of the vessel with the head plate as explained hereinbefore. Because the vessel now provides a sealed chamber which can be sterilized without disassembly, the apparatus is particularly suited to use with safety in fermentation processes including pathogenic organisms.

Fermentation apparatus 10 is largely self-contained and need merely be connected to a source of electric power, a source of water, a source of steam, and a source of air, all of which are generally available in laboratories and industrial plants, to be installed for proper operation. Thus, without requiring any further equipment or accessories, other than that ordinarily provided in locations where such apparatus will be installed, apparatus 10 can be placed in operation with the minimum of complexity and cost.

It is to be understood that the above detailed description of an embodiment of the invention is provided by way of example only. Various details of design and construction may be modified without departing from the true spirit and scope of the invention as set forth in the appended claims.

What is claimed is:

1. A fermentation apparatus capable of sterilizing a culture growth medium contained therein prior to the inoculation of the culture growth medium with a culture and carrying out a subsequent fermentation process while in a fully assembled configuration, said apparatus comprising a frame, a headplate, a vessel for containing the medium filling the vessel to a predetermined level, the vessel having a mouth and being removably mounted to the headplate at said mouth, said headplate and vessel defining an assembly of elements, one of which is fixed to said frame, impeller means extending into said vessel and carried by said assembly for rotation within the vessel below said predetermined level, baffle means carried by said headplate and vessel assembly and extending into the vessel below said predetermined level, said baffle means comprising a tubular member having inlet and outlet ends, first means interconnected with the inlet and outlet ends of said baffle means for circulating a heat exchange medium through said baffle means during a fermentation process, said first means being responsive to the temperature of the culture growth medium to selectively circulate a heat exchange medium which is relatively warmer or cooler than the culture growth medium for regulating the temperature of same, and second means interconnected with the inlet and outlet ends of said baffle means for circulating a relatively high temperature heat exchange medium through said baffle means when the culture growth medium in the vessel is to be sterilized, whereby the temperature of said culture growth medium may be raised to a sterilizing temperature.

2. A fermentation apparatus as claimed in claim 1 wherein said headplate is fixed to said frame and said impeller means and said baffle means are carried by said headplate.

3. A fermentation apparatus as claimed in claim 1 wherein said baffle means includes at least two hollow tubular baffle members, each having an unobstructed passage therein and means interconnecting the passages to one another to establish a path passing through the baffle members and through the medium in the vessel.

4. A fermentation apparatus as claimed in claim 1 wherein said first means includes means for receiving relatively cool liquid from a source, a heater for selectively heating the relatively cool liquid, and means responsive to the temperature of the culture growth medium for controlling the heating of the relatively cool liquid.

5. A fermentation apparatus as claimed in claim 1 and including at least one conduit carried by said headplate and vessel assembly, each said conduit having a port and means connecting each said port with said second means whereby said high temperature heat exchange medium may be selectively circulated to each said port for sterilizing the port.

6. A fermentation apparatus as claimed in claim 2 wherein said vessel is generally cylindrical and the central axis thereof is oriented vertically, said vessel including a closed bottom and said mouth comprising an open top, and means carried by said headplate and vessel assembly for removably securing said vessel to said headplate such that said vessel is suspended from said headplate.

7. A fermentation apparatus as claimed in claim 1 and including sealing means between said headplate and said vessel for establishing a sealed chamber within said vessel and means proximate the mouth of said vessel for receiving steam for establishing a steam barrier between said sealed chamber and the outside of said vessel.

8. A fermentation apparatus as claimed in claim 1 wherein said vessel is constructed of stainless steel.

9. In a fermentation apparatus employed in fermentation processes including pathogenic organisms:
a vessel for containing a culture growth medium and having a mouth;
a headplate removably mounted to the vessel and closing the mouth thereof at mating surfaces;
sealing means between the headplate and the vessel for establishing a sealed chamber within the vessel; and
means juxtaposed with the sealing means for receiving steam to establish a steam barrier between the sealed chamber and the outside of the vessel adjacent the mouth of the vessel.

10. The improvement of claim 9 wherein the means juxtaposed with the sealing means includes a trough juxtaposed with the sealing means and communicating with the mating surfaces, an inlet conduit communicating with the trough for carrying steam to the trough and an outlet conduit communicating with the trough for carrying condensate from the trough.

11. The improvement of claim 10 wherein the vessel includes an integral annular flange and the headplate overlaps said flange, the sealing means including first and second gaskets between the headplate and the flange and spaced from one another, said trough extending between said first and second gaskets whereby said gaskets serve to seal steam within said trough as well as establish said sealed chamber.

References Cited

UNITED STATES PATENTS

| | | | |
|---|---|---|---|
| 2,463,143 | 3/1949 | Brewer | 195—127 |
| 2,686,754 | 8/1954 | Monod | 195—143 |
| 2,793,166 | 5/1957 | Hatch | 195—143 |
| 3,015,612 | 1/1962 | Pirt et al. | 195—142 |

OTHER REFERENCES

Wegrich et al.: Ind. and Eng. Chem. vol. 45, pp. 1153–1160 (1953).

ALVIN E. TANENHOLTZ, *Primary Examiner.*

U.S. Cl. X.R.

195—142, 143